United States Patent [19]

Matsuura et al.

[11] 4,310,357
[45] Jan. 12, 1982

[54] LOW TEMPERATURE SEALING GLASS

[75] Inventors: Ichiro Matsuura, Otsu; Fumio Yamaguchi, Shiga, both of Japan

[73] Assignee: Nippon Electric Glass Company, Limited, Otsu, Japan

[21] Appl. No.: 149,160

[22] Filed: May 14, 1980

[51] Int. Cl.³ ............................................. C03C 3/12
[52] U.S. Cl. ...................................... 501/15; 501/22; 501/76; 501/153; 501/154
[58] Field of Search ............... 106/47 R, 53, 73.5

[56] References Cited

U.S. PATENT DOCUMENTS

| | | | |
|---|---|---|---|
| 3,455,708 | 7/1969 | Earl | 106/53 |
| 3,954,486 | 5/1976 | Francel et al. | 106/53 |
| 3,963,505 | 6/1976 | Dumesnil et al. | 106/47 R |
| 4,139,832 | 2/1979 | Yoshino et al. | 338/308 |
| 4,186,023 | 1/1980 | Dumesnil et al. | 106/53 |
| 4,256,495 | 3/1981 | Kawamura et al. | 106/53 |

FOREIGN PATENT DOCUMENTS

| | | | |
|---|---|---|---|
| 55-010426 | 1/1980 | Japan | 106/53 |
| 625466 | 6/1949 | United Kingdom | 106/53 |
| 509548 | 4/1976 | U.S.S.R. | 106/53 |

*Primary Examiner*—Helen M. McCarthy
*Attorney, Agent, or Firm*—Kurt Kelman

[57] ABSTRACT

A low temperature sealing glass composition consisting of 60–80% by weight of vitreous solder glass of $PbO$-$B_2O_3$ system having a deformation point of 350° C. or less, and 20–40% by weight of willemite. The vitreous $PbO$-$B_2O_3$ system glass comprises 70–90% by weight of $PbO$, 10–15% by weight of $B_2O_3$, 0.5–5% by weight of $SiO_2$, 0–5% by weight of $Al_2O_3$, 0–5% by weight of $ZnO$, 0–15% by weight of $PbF_2$ and 0–5% by weight of $Bi_2O_3$.

3 Claims, No Drawings

LOW TEMPERATURE SEALING GLASS

BACKGROUND OF THE INVENTION

This invention relates to sealing glass compositions and, in particular, to such compositions for sealing alumina ceramic packages in which integrated circuits or other solid state devices are encapsulated.

As a known sealing glass composition for sealing alumina ceramic packages, there has been used one which comprises a devitrifying solder glass and zircon (zirconium silicate, $ZrSiO_4$). Since the sealing glass of this type requires a long sealing time and high sealing temperature, it is uneconomical with respect to heat energy. Furthermore, it has been recently discovered that α-ray radiated from radioactive impurities included in the zircon causes soft errors of the integrated circuit.

Another known type of sealing glass composition comprises vitreous solder glass and β-eucryptite or lead titanate. The sealing glass of this type is more desirable because it requires shorter sealing time and lower sealing temperature. But the glass composition including β-eucryptite is poor in acid resistance, and tends to degrade in electric resistance during long exposure to an environment of a high temperature and a high humidity. The glass composition including lead titanate has high dielectric constant and, therefore, cannot be used for high frequency applications.

SUMMARY OF THE INVENTION

It is an object of this invention to provide an improved low temperature sealing glass whose sealing temperature is 450° C. or less, requires a short sealing time such as 10 minutes or less, has excellent heat resistance, high strength to heat shock and high mechanical strength, and a low dielectric constant, and which neither includes any radioactive substances nor degrades in electric resistance in long use in an environment of a high temperature and high humidity.

According to this invention, a low temperature sealing glass composition consists of 60–80% by weight of vitreous glass of a $PbO-B_2O_3$ system having a deformation point of 350° C. or less, and 20–40% by weight of willemite ($Zn_2SiO_4$). The vitreous $PbO-B_2O_3$ system glass comprises 70–90% by weight of PbO, 10–15% by weight of $B_2O_3$, 0.5–5% by weight of $SiO_2$, 0–5% by weight of $Al_2O_3$, 0–5% by weight of ZnO, 0–15% by weight of $PbF_2$, and 0–5% by weight of $Bi_2O_3$.

DETAILED DESCRIPTION OF PREFERRED EMBODIMENTS

The low temperature sealing glass of this invention is a mixture of 60–80 wt. % of vitreous glass and the balance of willemite ($Zn_2SiO_4$). If the amount of vitreous glass is less than 60 wt. %, the composition degrades the flowing property and makes an imperfect seal. If the amount of vitreous glass exceeds 80 wt. %, the composition has an undesired high thermal expansion coefficient and degrades the strength to heat shock. The ingredients of the sealing glass are indicated in Table 1.

TABLE 1

|  | Wt. % range | Example A | Example B | Example C | Example D |
|---|---|---|---|---|---|
| PbO | 70–90 | 85 | 73 | 84 | 84 |
| $B_2O_3$ | 10–15 | 13 | 12 | 12 | 12 |
| $SiO_2$ | 0.5–5 | 1 | 1 | 1 | 1 |
| $Al_2O_3$ | 0–5 | 1 | — | — | — |
| ZnO | 0–5 | — | 4 | 3 | 2 |
| $PbF_2$ | 0–15 | — | 10 | — | — |
| $Bi_2O_3$ | 0–5 | — | — | — | 1 |
| Deformation Temperature (°C.) | 350 or less | 330 | 300 | 320 | 320 |

Red lead, boric acid, silica sand, aluminum hydroxide, zinc oxide, lead fluoride and bismuth oxide were used as materials of PbO, $B_2O_3$, $SiO_2$, $Al_2O_3$, ZnO, $PbF_2$ and $Bi_2O_3$, respectively. In order to produce glasses A–D in Table 1, those materials were weighed and blended according to weight percent indicated in the table. The batch components for each of glasses A–D were molten at 900° C. for 30 minutes in a platinum crucible. The molten glass was cooled and shaped into a thin plate. The glass plate was milled in an alumina ball mill and then was screened through a 150 mesh screen.

The resulting screened frit of each glass A–D was mixed with willemite ($Zn_2SiO_4$). The willemite used was prepared as follows: zinc oxide and silica sand were blended so that the ratio of ZnO to $SiO_2$ is 2:1 by molar ratio, and sintered at a temperature of 1450° C. during 15 hours. The sintered body was milled in an alumina ball mill and then screened through a 325 mesh screen. The weight percentages of glass and willemite are indicated in Table 2.

TABLE 2

|  | 1 | 2 | 3 | 4 | 5 | 6 |
|---|---|---|---|---|---|---|
| Glass A (wt. %) | 66.5 | 71.5 | — | 76.0 | — | — |
| Glass B (wt. %) | — | — | 65.0 | — | — | — |
| Glass C (wt. %) | — | — | — | — | 71.0 | — |
| Glass D (wt. %) | — | — | — | — | — | 63.0 |
| Willemite (wt. %) | 33.5 | 28.5 | 35.0 | 24.0 | 29.0 | 37.0 |
| Thermal Expansion Coefficient ($\times 10^{-7}$°C.) | 62 | 68 | 63 | 72 | 65 | 58 |
| Deformation Temperature (°C.) | 348 | 342 | 320 | 340 | 330 | 340 |
| Sealing Temperature (°C.) | 450 | 430 | 450 | 420 | 410 | 450 |

Each mixture 1–6 in Table 2 was mixed with a suitable vehicle to form a paste. The vehicle used was α-terpineol solution of 5% acrylic resin. The paste was used for sealing a package for integrated circuits, according to a conventional sealing method. The sealing could be performed at a temperature of 450° C. or less during a short time of 10 minutes or less.

In Table 2, the thermal expansion coefficient, deformation temperature, and sealing temperature of each tested solder glass 1–6 are shown. It will be noted that each tested low temperature sealing glass has a thermal expansion coefficient very close to that of alumina package which is generally about $70 \times 10^{-7}$/° C. This means that the mismatch of thermal expansion coefficient is avoidable, and therefore these low temperature sealing glass compositions are desirable for sealing alumina packages.

Although packages sealed by low temperature sealing glass of this invention were exposed to thermal shock from 150° C. to −65° C. 15 times, the seal of each package was still maintained in good condition.

Furthermore, packages with leads by solder glass of this invention were in an environment of a temperature of 65° C. and of a relative humidity of 90% during 1000 hours with an electric voltage of 40 V applied between a pair of leads. No leakage current still presented between the pair of leads. Dielectric constants of these glasses were 13.0 or less.

Acid resistance of low temperature sealing glass of this invention was tested by soaking it in 20% sulfuric acid solution at a temperature of 70° C. for 1 minute. The weight loss of only 0.3 mg/cm$^2$ was observed. After soaking it in 10% hydrochloric acid solution at 20° C. for 10 minutes, the weight loss was 4.0 mg/cm$^2$ or less. And after soaking it in 10% nitric acid solution at room temperature for 10 minutes, the weight loss was 200 mg/cm$^2$. These data mean that the low temperature sealing glass of this invention has a property of acid resistance sufficient to withstand the actual acid treatment process and/or plating process.

The low temperature sealing glass composition of this invention is usable for sealing not only packages for integrated circuits but also display panels or the like.

What is claimed is:

1. A low temperature sealing glass composition consisting of vitreous solder glass of $PbO-B_2O_3$ system having a deformation point of 350° C. or less, in which the solder glass is 66.5 wt. % with the balance being willemite, and said solder glass comprising 85 wt. % of PbO, 13 wt. % of $B_2O_3$, 1 wt. % of $SiO_2$ and 1 wt. % of $Al_2O_3$.

2. A low temperature sealing glass composition consisting of vitreous solder glass of $PbO-B_2O_3$ system having a deformation point of 350° C. or less, in which the solder glass is 65.0 wt. % with the balance being willemite, and said solder glass comprising 73 wt. % of PbO, 12 wt. % of $B_2O_3$, 1 wt. % of $SiO_2$, 4 wt. % of ZnO and 10 wt. % of $PbF_2$.

3. A low temperature sealing glass composition consisting of vitreous solder glass of $PbO-B_2O_3$ system having a deformation point of 350° C. or less, in which the solder glass is 63.0 wt. % with the balance being willemite, and said solder glass comprising 84 wt. % of PbO, 12 wt. % of $B_2O_3$, 1 wt. % of $SiO_2$, 2 wt. % of ZnO and 1 wt. % of $Bi_2O_3$.

* * * * *